United States Patent [19]

Fujita

[11] Patent Number: 5,038,034
[45] Date of Patent: Aug. 6, 1991

[54] SCANNING TUNNELING MICROSCOPE

[75] Inventor: Shigeto Fujita, Amagasaki, Japan

[73] Assignee: Mitsubishi Denki Kabushiki Kaisha, Tokyo, Japan

[21] Appl. No.: 399,849

[22] Filed: Aug. 29, 1989

[30] Foreign Application Priority Data

Nov. 15, 1988 [JP] Japan ................................. 63-289273

[51] Int. Cl.⁵ ............................................. H01J 37/00
[52] U.S. Cl. ..................................... 250/306; 250/307; 250/423 F
[58] Field of Search ............... 250/306, 307, 309, 310, 250/311, 423 F

[56] References Cited

U.S. PATENT DOCUMENTS

| | | | |
|---|---|---|---|
| 3,864,572 | 2/1975 | Van der Mast et al. | 250/306 |
| 4,343,993 | 8/1982 | Binnig et al. | 250/423 F |
| 4,668,865 | 5/1987 | Gimzewski et al. | 250/423 F |
| 4,798,989 | 1/1989 | Miyazaki et al. | 250/311 |
| 4,806,755 | 2/1989 | Duerig et al. | 250/423 F |
| 4,918,309 | 4/1990 | Beha et al. | 250/306 |

FOREIGN PATENT DOCUMENTS

| | | | |
|---|---|---|---|
| 0265101 | 11/1988 | Japan | 250/306 |
| 0265102 | 11/1988 | Japan | 250/306 |

OTHER PUBLICATIONS

Hyomen Kaguku (Surface Science), vol. 8, No. 1 (1987), pp. 2-13.

Primary Examiner—Jack I. Berman
Assistant Examiner—Kiet T. Nguyen
Attorney, Agent, or Firm—Morrison Law Firm

[57] ABSTRACT

A scanning tunneling microscope is arranged to cause a tunneling current to flow through a gap between a specimen and a probe housed in a vacuum chamber, and is provided with a working arrangement for reshaping the probe. The arrangement enables the reshaping of the probe without releasing a vacuum in the vacuum chamber.

7 Claims, 2 Drawing Sheets

SCANNING TUNNELING MICROSCOPE

This invention relates to a scanning tunneling microscope.

BACKGROUND OF THE INVENTION

FIG. 1 shows a schematic structure of a conventional scanning tunneling microscope which is disclosed, for example, in HYOMEN KAGAKU (Surface Science), Vol. 8, No. 1 (1987), Pages 2-13. The scanning tunneling microscope shown in FIG. 1 comprises a vacuum chamber 1 a stage 3 on which a specimen 4 is disposed a probe 5 having its tip end disposed to face the specimen 4, a piezoelectric element 6, and a scanning system 8. The reference numeral 2 represents air in the chamber 1 before it is evacuated, and the reference numeral 7 represents tunneling current.

The operation of this microscope is as follows. The specimen 4 is positioned on the stage 3 which is provided with vibration isolation. The probe 5 of, for example, tungsten is disposed at a position spaced by about 10 angstroms from the surface of the specimen 4. Air 2 in the vacuum chamber 1 is exhausted in the direction indicated by an arrow A by means of an evacuation system (not shown) so that ultrahigh vacuum in the order of $10^{-8}$ torr can be achieved in the chamber 1. A negative voltage is applied to the probe 5 with the specimen 4 grounded, which causes the tunneling current 7 to flow through the gap between the probe 5 and the specimen 4. The tunneling current 7 is detected, and the probe 5 is caused to move in the direction perpendicular to the surface of the specimen 4 by means of the piezoelectric element 6 in such a manner that the tunneling current 7 is maintained constant. The length of the piezoelectric element 6 increases in proportion to a voltage applied to it (e.g. 1 mm per volt), and, accordingly, the probe 5 moves in the vertical direction in an amount proportional to that voltage. Thus, the amount of the vertical movement of the probe 5 can be determined from the voltage applied to the piezoelectric element 6. At the same time, the probe 5 is caused to move in parallel with the surface of the specimen 4 by means of the scanning system 8 to scan the surface of the specimen 4. From the thus measured amounts of movement of the probe 5 in the directions perpendicular to and parallel to the surface of the specimen 4, the surface atomic structure is determined.

In the conventional scanning tunneling microscope arranged as stated above, because the spacing of about 10 angstroms between the probe 5 and the specimen 4 is too small, the probe 5 tends to contact the specimen 4, which may cause the tip end of the probe 5 to be damaged because it is very fine. In the conventional scanning tunneling microscope, it is necessary to replace a probe each time it is damaged. In addition, each time the probe 5 is to be replaced with a new one, the ultrahigh vacuum of about $10^{-8}$ torr in the vacuum chamber 1 must be once released, and after the replacement of the probe 5, the chamber 1 must be re-evacuated to the required ultrahigh vacuum of about $10^{-8}$ torr. It is a time consuming work.

SUMMARY OF THE INVENTION

The object of the present invention is to provide a scanning tunneling microscope which is free of the abovementioned drawbacks of the conventional microscope. According to the present invention, even when a probe is damaged it need not be replaced and, therefore, it is not necessary to release ultrahigh vacuum in a vacuum chamber, which is about $10^{-8}$ torr.

A scanning tunneling microscope according to the present invention comprises a vacuum chamber within which a specimen is disposed, a probe disposed within the vacuum chamber such that its tip end faces the specimen and tunneling current flows in a gap between the tip end and the specimen, and a working arrangement for reshaping the probe within the chamber.

DETAILED DESCRIPTION OF THE INVENTION

Figure 1:
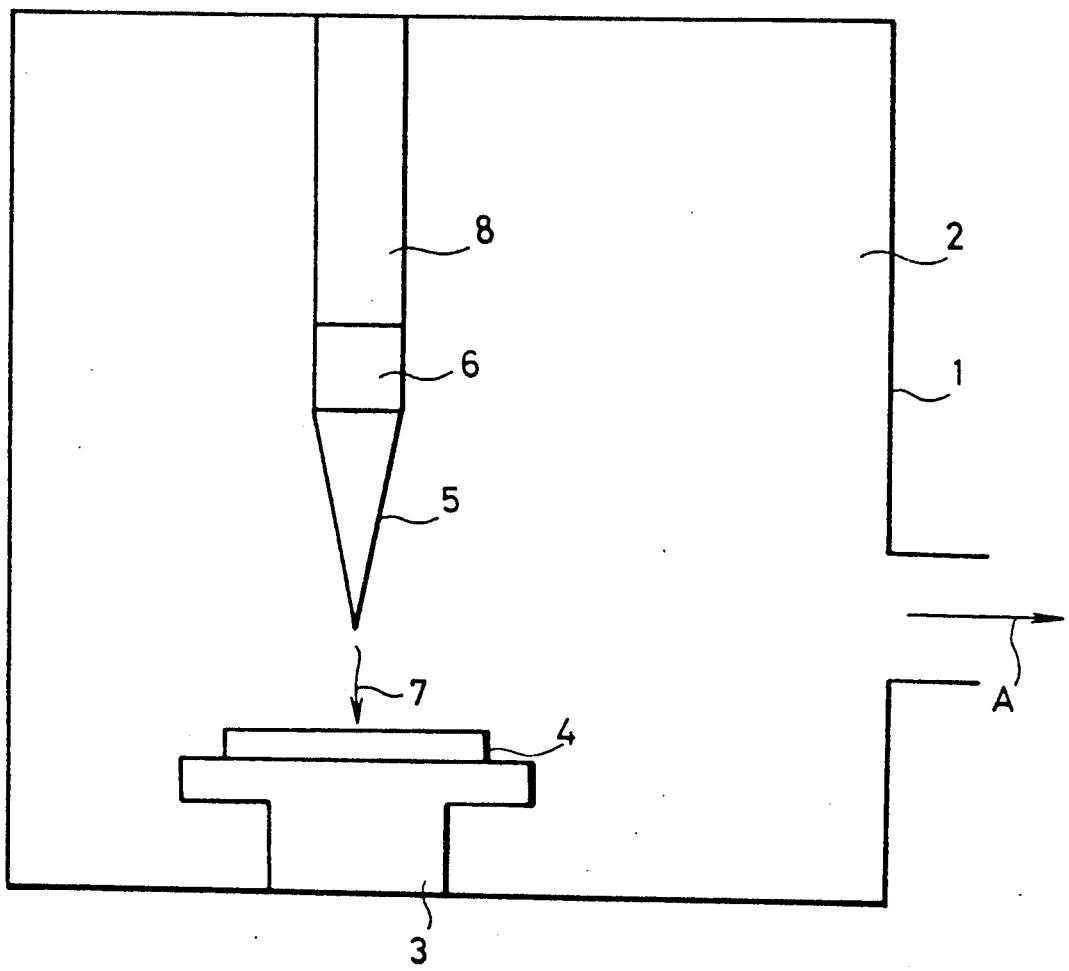
FIG. 1 shows schematically an arrangement of a conventional scanning tunneling microscope.

Now, the present invention is described with reference to one embodiment shown in the drawings.

Figure 2:
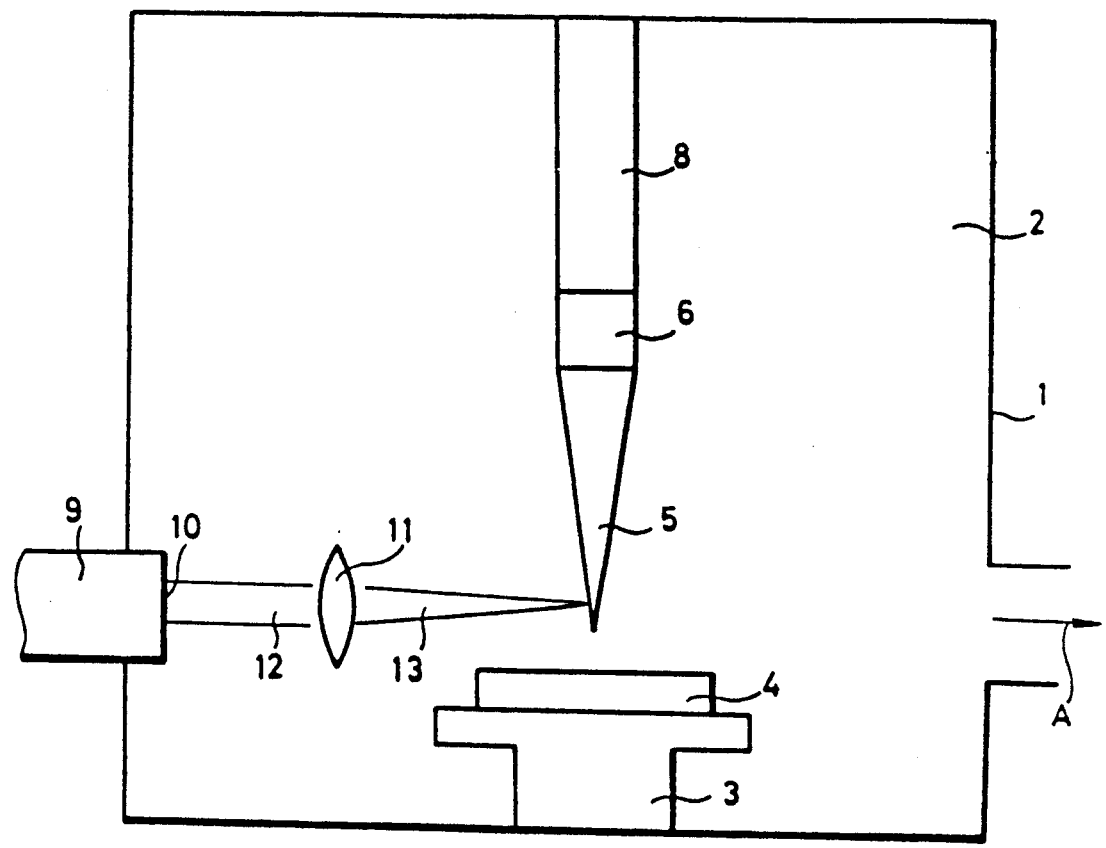
FIG. 2 shows schematically a scanning tunneling microscope according to one embodiment of the present invention.
Figure 3:
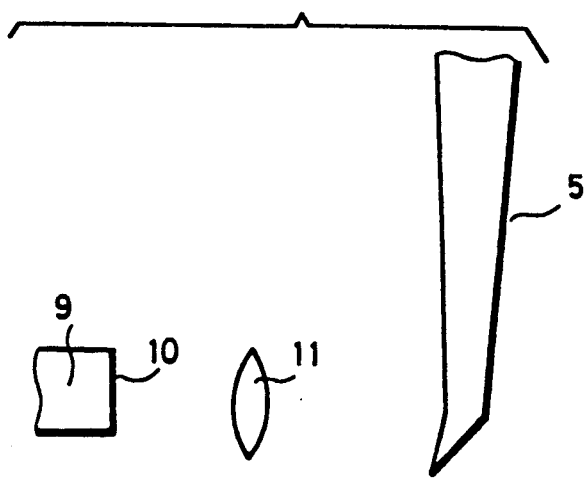
FIG. 3 shows a damaged probe.
Figure 4:
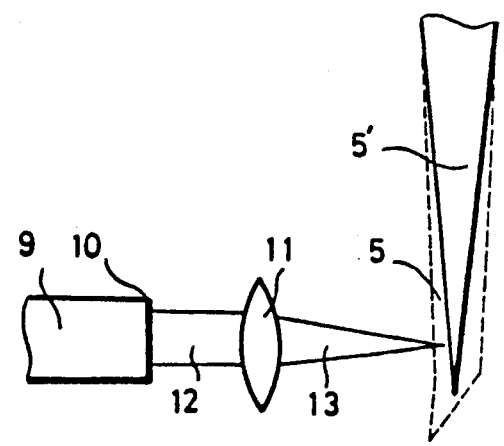
FIG. 4 shows a probe which has been reshaped by means of a laser beam.

FIG. 2 shows a schematic structure of a scanning tunneling microscope according to one embodiment of the present invention. In FIGS. 2 through 4, the same reference numerals as used in FIG. 1 represent components or functions similar to ones shown in FIG. 1. The scanning tunneling microscope of FIG. 2 comprises in addition to components similar to the components 1 through 8 of the conventional microscope shown in FIG. 1, a laser beam generator 9 having an output section 10 from which a laser beam 12 is emitted, and an optical system 11 for the laser beam 12 for producing a focused laser beam 13. A laser beam of any wavelength may be used, and its power is preferably from about several thousand kilowatts to about several megawatts.

The laser beam generator 9 and the optical system 11 form a probe working arrangement for reshaping the probe 5. By way of example, the probe 5 has a length of about 1 cm a diameter at its proximal end of about 0.1 mm and a diameter at its distal end or tip of from about several angstroms to about several tens angstroms.

Now, the operation is described. Assume a situation that when the arrangement of atoms at the surface of the specimen 4 is going to be investigated in the same manner as in the conventional microscope, the probe 5 contacts the surface of the specimen 4 so that its tip end is broken as shown in FIG. 3. As shown in FIG. 2, the output section 10 of the laser beam generator 9 and the optical system 11 are within the vacuum chamber 1, and the laser beam 12 emitted from the output section 11 is condensed into the laser beam 13 which is focused on the tip end of the probe 5 within the chamber 1.

As shown in FIG. 4 the focused laser beam 13 projected onto the tip end of the damaged probe 5 indicated by a broken line, reshapes it into a probe 5' indicated by a solid line. With this reshaped probe 5', the investigation of the atomic arrangement at the surface of the specimen 4 can be resumed.

As is understood from the above description, according to the present invention, need for replacing a probe each time it is damaged and, consequently, need for releasing an ultrahigh vacuum in the order of $10^{-8}$ torr in the vacuum chamber before the probe is replaced can be eliminated, so that considerable time can be saved.

In the above-described embodiment, a laser beam is used for reshaping a probe, but an electron beam or an ion beam may be used instead. Alternatively, the damaged probe may be reshaped by means of an etching gas such as, for example, $Cl_2$ and $CC_4$.

Furthermore, in the above-described embodiments, the arrangement for reshaping the probe, for example, the laser output section and the optical system are placed in the vacuum chamber, but the probe reshaping arrangement may be mounted outside the vacuum chamber, in which case the probe is reshaped through, for example, a viewing window formed in the vacuum chamber.

As stated above because the scanning tunneling microscope according to the present invention is provided with a working arrangement for reshaping a probe without removing it from an evacuated chamber the probe need not be replaced even when it is damaged and, accordingly, it is not necessary to release an ultra-high vacuum condition of the vacuum chamber for the probe replacement. Thus, the present invention provides a scanning tunneling microscope which is very easy to handle.

What is claimed is:

1. A scanning tunneling microscope comprising:
a vacuum chamber;
means for mounting a specimen in said vacuum chamber;
a probe in said vacuum chamber;
a tip of said probe facing said means for mounting, whereby a scanning of said specimen can be performed;
said tip being subject to transverse deformation resulting from contact with said specimen during scanning of said specimen;
means for reshaping said probe to remove said transverse deformation of said tip, whereby scanning of said specimen can be resumed;
said means for reshaping includes a laser, said laser having sufficient power to remove material from a surface of said probe; and
said means for reshaping being operable in a vacuum chamber, whereby said probe may be reshaped without releasing a vacuum from said vacuum chamber.

2. A scanning tunneling microscope according to claim 1, wherein said laser is disposed inside said vacuum chamber.

3. A scanning tunneling microscope according to claim 1, wherein a substantial part of said laser is disposed outside said vacuum chamber, and said vacuum chamber includes a window, that is substantially transparent to an optical output of said laser, for permitting said optical output to impinge on said probe.

4. A scanning tunneling microscope comprising:
a vacuum chamber;
means for mounting a specimen in said vacuum chamber;
a probe in said vacuum chamber;
a tip of said probe facing said means for mounting, whereby a scanning of said specimen can be performed;
said tip being subject to transverse deformation resulting from contact with said specimen during scanning of said specimen;
means for reshaping said probe to remove said transverse deformation of said tip, whereby scanning of said specimen can be resumed;
said means for reshaping includes a beam of charged particles; and
said means for reshaping being operable in a vacuum chamber, whereby said probe may be reshaped without releasing a vacuum from said vacuum chamber.

5. A scanning tunneling microscope according to claim 4, wherein said charged particles are electrons.

6. A scanning tunneling microscope according to claim 4, wherein said charged particles are ions.

7. A scanning tunneling microscope comprising:
a vacuum chamber;
means for mounting a specimen in said vacuum chamber;
a probe in said vacuum chamber;
a tip of said probe facing said means for mounting, whereby a scanning of said specimen can be performed;
said tip being subject to transverse deformation resulting from contact with said specimen during scanning of said specimen;
means for reshaping said probe to remove said transverse deformation of said tip, whereby scanning of said specimen can be resumed;
said means for reshaping includes an etching gas; and
said means for reshaping being operable in a vacuum chamber, whereby said probe may be reshaped without releasing a vacuum from said vacuum chamber.

* * * * *